United States Patent [19]

Steed

[11] 4,020,828
[45] May 3, 1977

[54] PRESSURE RELIEF VALVE APPARATUS AND METHOD

[75] Inventor: Michael Halsey Steed, East Palo Alto, Calif.

[73] Assignee: Fafco Incorporated, Menlo Park, Calif.

[22] Filed: Dec. 15, 1975

[21] Appl. No.: 640,908

[52] U.S. Cl. .................................. 126/271; 137/859
[51] Int. Cl.² ............................................ F24J 3/02
[58] Field of Search ............ 126/270, 271; 237/1 A; 137/525, 525.5

[56] References Cited
UNITED STATES PATENTS

| | | | |
|---|---|---|---|
| 2,553,302 | 5/1951 | Cornwall | 126/271 |
| 3,827,456 | 8/1974 | Sheppard | 137/525 |

Primary Examiner—Kenneth W. Sprague
Assistant Examiner—James C. Yeung
Attorney, Agent, or Firm—Flehr, Hohbach, Test, et al.

[57] ABSTRACT

A valve body is formed of a section of flow pipe for connection to an open end on a flow pipe by means of a surrounding sealing sleeve and outer clamp. A valve body end cap is formed of a standard pipe cap with inlet ports drilled through the end thereof. A valve seat member is centrally mounted on the inside of the valve body end cap having a valve seat on the end opposite the mounting end. The valve seat member has a first predetermined height for positioning the valve seat a predetermined distance above the inside surface of the end cap. An internal step is formed on the inside diameter of the end cap at a second predetermined height above the inside of the end cap. A spacing ring is placed on the internal step having a thickness to provide for a desired difference between the first predetermined height and the sum of the second predetermined height and the spacing ring thickness. A diaphragm formed to fit the inside diameter of the valve body end cap is positioned with one face in contact with the ring. The valve body is inserted into the valve body end cap to assume a position in firm contact with the other face of the diaphragm at the periphery thereof. The diaphragm has formed therethrough a centrally located pressure relief port. The center portion of the diaphragm is deflected by contact with the valve seat through an axial distance determined by the difference between the first and second predetermined heights and the thickness of the spacing ring. When the inside of the pressure relief valve is communicated with a closed flow path, a predetermined pressure differential across the diaphragm, with the higher pressure at the inlet ports, will urge the diaphragm through further axial deflection, thus lifting the diaphragm from the valve seat and communicating the differential pressures thereacross through the inlet port and pressure relief port until the pressure differential falls to or below the predetermined pressure differential.

9 Claims, 4 Drawing Figures

PRESSURE RELIEF VALVE APPARATUS AND METHOD

BACKGROUND OF THE INVENTION

This invention relates to a pressure relief valve and more particularly to such a relief valve for introducing higher pressure into a lower pressure volume when a predetermined pressure differential exists therebetween.

Previous pressure relief valves have required complex precision component parts for obtaining communication between two differing pressure volumes. Pressure relief between two pressure volumes at different predetermined pressure differentails often requires major modification of complex parts. Methods for obtaining pressure relief between differential pressure volumes generally involve the use of sophisticated valving, particularly when relief is desired only at or above a predetermined pressure differential. Consequently, a pressure relief valve and method is needed wherein all of the valve parts are simply formed of available materials and wherein the valving is obtained through simple steps involving an incremental deflection of a fluid impermeable diaphragm.

SUMMARY AND OBJECTS OF THE INVENTION

A pressure relief valve is disclosed herein for use with a closed flow channel. A valve body is adapted for connection to and communication with the closed flow channel. An inlet port extends through the valve body and a fluid impervious diaphragm is mounted within the valve body having a pressure relief port extending therethrough. The fluid impervious diaphragm is securely mounted in a preselected position inside the valve body. A valve seat member is also mounted inside the valve body carrying a valve seat on the end opposite from the mounting end. The valve seat member is disposed to contact one face of the diaphragm to deflect the center of the diaphragm through a predetermined axial distance. When the valve seat is in contact with the face of the diaphragm the inlet port is isolated from the pressure relief port. When a predetermined pressure differential exists across the fluid impervious diaphragm with the higher pressure at the inlet port, additional deflection of the diaphragm occurs and the inlet port is communicated with the pressure relief port to decrease the pressure differential to or below the predetermined pressure differential.

In general it is an object of the present invention to pressure relief valve of simple construction for operation at any one of a wide range of pre-selected pressure differentials imposed thereacross.

Another object of the present invention is to provide a pressure relief valve having several means of calibration for obtaining the desired operating pressure differential.

Another object of the present invention is to provide a pressure relief valve which is not fouled in environments containing heavy concentrations of suspended dust and grit particles, or corrosive chemicals.

Another object of the present invention is to provide a pressure relief valve for protecting solar heat exchange panel assemblies when in an inoperative condition.

Another object of the present invention is to provide a pressure relief valve prevents inadvertent flow through a solar heat exchange panel assembly resulting from restrictions in the open main flow valve.

Another object of the present invention is to provide a pressure relief valve having inexpensive parts which can be assembled in minimal time by unskilled personnel.

Additional objects and features of the invention will appear from the following description in which the preferred embodiment has been set forth in detail in conjunction with the accompanying drawings.

DESCRIPTION OF THE PREFERRED EMBODIMENTS

Figure 1:
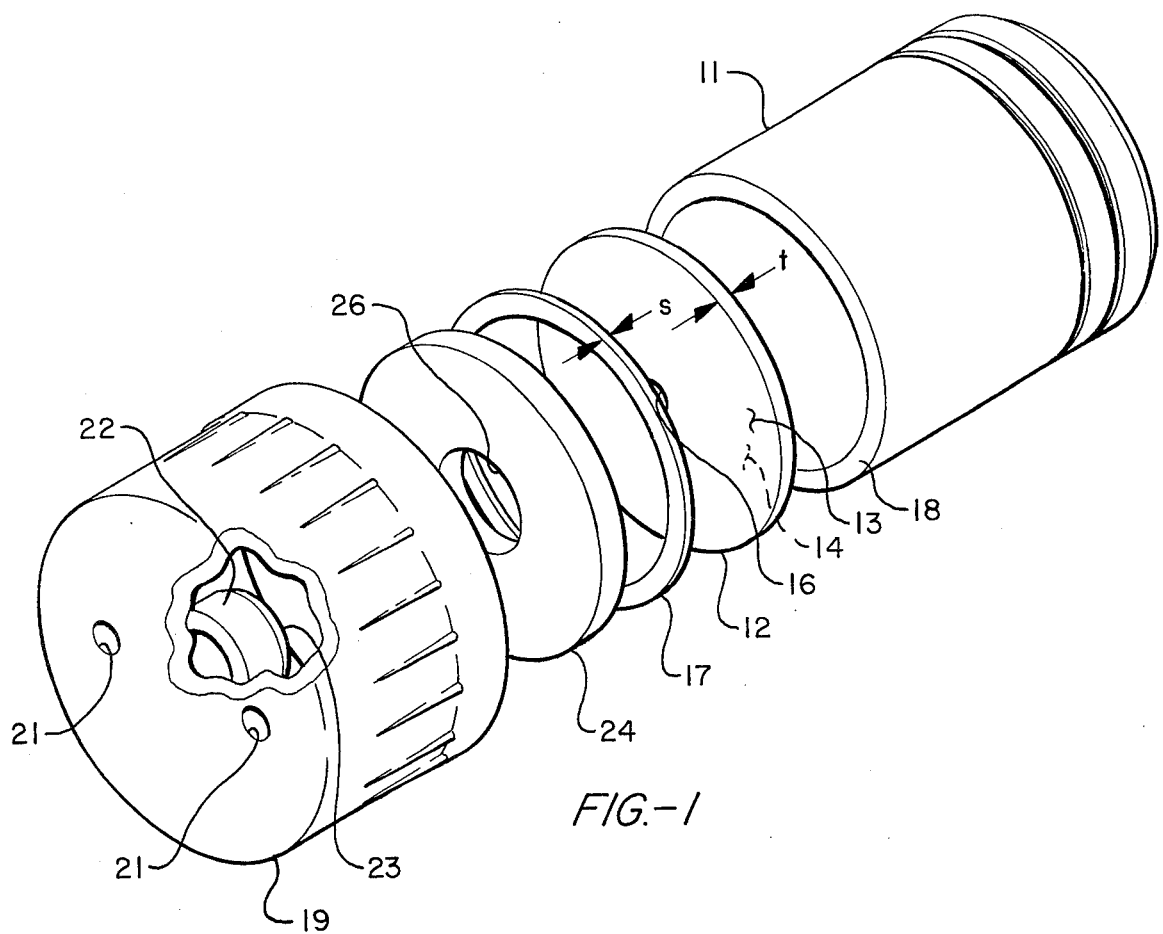
FIG. 1 is an isometric exploded view of the pressure relief valve.

In FIG. 1 an exploded view of the pressure relief valve disclosed herein shows a sleeve or valve body 11, which may be formed from a section of standard two inch plastic pipe. A flexible diaphragm 12 is shown having a thickness t, opposing faces 13 and 14, and a centrally located aperture or pressure relief port 16. A ring 17 having a thickness s in the axial direction, is provided which may be formed by slicing off a thin section of the standard plastic pipe used to form valve body 11. Valve body 11 has one end 18 for contacting opposing face 14 on diaphragm 12. It has been found advantageous to secure diaphragm 12 to one end 18 by means of an appropriate adhesive. Ring 17 contacts the face 13 on diaphragm 12.

A valve body end cap 19 is provided which may take the form of a standard plastic end cap for the previously mentioned standard two inch plastic pipe. Valve body end cap 19 has a pair of inlet ports 21 extending through the end thereof in this embodiment. A valve seat member 22 is mounted internally on end cap 19, centrally disposed on the end thereof. Valve seat member 22 has a valve seat 23 formed on the one end distal from the mounting end thereof. A filter 24 having a centrally located aperture 26 therethrough for surrounding valve seat member 22 is placed adjacent to the inside end of valve body end cap 19 overlying inlet ports 21. The entire valve body may be construed as including valve body 11 and valve body end cap 19.

Figure 2:
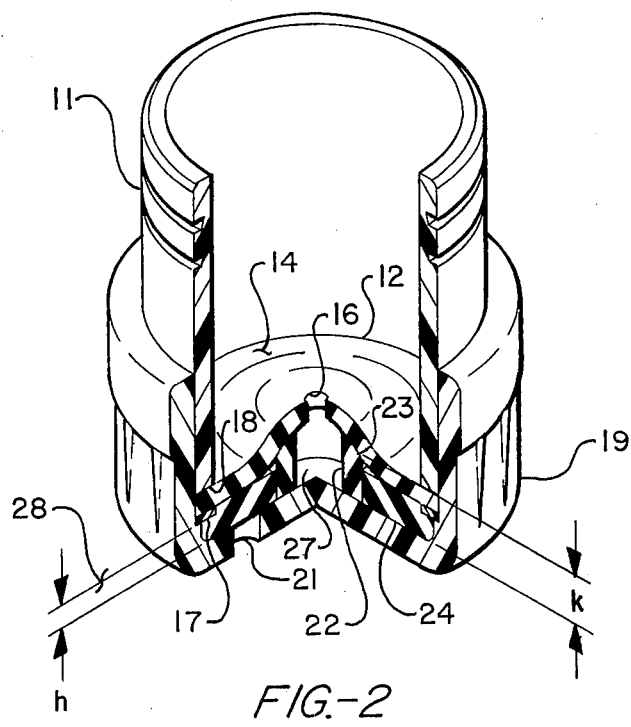
FIG. 2 is an isometric sectional view of the pressure relief valve.

Turning to FIG. 2 the assembled pressure relief valve is shown wherein valve body end cap 19 has an internal end surface 27 for mounting valve seat member 22. A ledge or step 28 is formed on the inner surface of valve body end cap 19 at a predetermined distance h from internal end surface 27. The length of valve seat member 22 determines the position of valve seat 23 relative to internal end surface 27, which is described as k.

Filter 24 is, in a preferred form, a gas permeable latex type material shown surrounding valve seat member 22 mounted on internal end surface 27. Ring 17 is formed to fit within the inside diameter of valve body end cap 19 and is placed therein to seat on step 28. Diaphragm 12 is formed of a fluid impervious material with some elasticity for allowing axial movement at the center thereof, and has a diameter to fit within the inside diameter of valve body end cap 19. Diaphragm 12 is positioned so that face 13 is in contact with ring 17. The inside diameter of ring 17 defines a predetermined face area on diaphragm 12 against which a pressure may be exerted. Valve body 11 has an outside diameter formed to fit within the inside diameter of valve body end cap 19 and is placed therein with end face 18 adhered to face 14 for securing diaphragm 12 in the assembly. Valve body 11 is generally held in place within valve body end cap 19 by means of an adhesive.

From the above, it may be seen that in the assembled pressure relief valve of FIG. 2 the central portion of diaphragm 12 is deflected axially through a distance defined by the relationship $d = k - h - s$. The axial deflection occurs when d is a positive number, and valve seat 23 is in positive contact with face 13 on diaphragm 12 surrounding pressure relief port 16. It may be seen that if the open end of valve body 11 is communicated with a closed flow path, a first or ambient volume is isolated from a second volume within the flow path. In the instance where the second volume assumes a pressure which is lower than the ambient or first volume pressure, a differential pressure occurs across diaphragm 12 due to the fluid impervious characteristic of diaphragm 12. When the pressure differential reaches a predetermined pressure differential, sufficient force will be exerted against face 13 of diaphragm 12 to cause an additional axial deflection of diaphragm 12 thereby lifting face 13 from valve seat 23. In this fashion, the first or ambient volume is communicated with the second volume within the closed flow path through inlet ports 21, gas permeable member or filter 24, the separation between diaphragm face 13 and valve seat 23, and pressure relief port 16. When sufficient pressure is introduced into the second volume through the aforementioned communication path between inlet ports 21 and pressure relief port 16, the differential pressure across diaphragm 12 will fall below the predetermined differential pressure and face 13 will again seat on valve seat 23 to once more isolate the first and second volumes.

A method has therefore been disclosed for relieving differential pressure between the first and second volumes which includes interposing an impermeable flexible diaphragm between the first and second volumes and providing a flow path therebetween through one part of the impermeable diaphragm. The flow path is obstructed by further interposing a member between the first volume and the one part of the impermeable diaphragm. In such a fashion, a high pressure in the first volume which produces a pressure differential between the first and second volumes causes the impermeable diaphragm to deflect, thereby communicating the first volume with the one part of the impermeable diaphragm and with the second volume through the flow path. The flow between the first and second volumes is preferably filtered to prevent dust and grit particles from the first volume from lodging between the impermeable diaphragm and the member obstructing the flow path in the absence of differential pressure across the diaphragm. Control of the magnitude of the pressure differential across the diaphragm at which the first and second volumes will be communicated is afforded by initially deflecting the impermeable diaphragm axially through a predetermined distance by urging the member obstructing the flow path thereagainst. The differential pressure across the diaphragm required to deflect the diaphragm further thereby becomes a function of the initial diaphragm deflection.

Additional controls of the differential pressure across diaphragm 12 at which face 13 will be separated from valve seat 23 is afforded by selection of the inside diameter of ring 17 and valve body 11, thereby defining the area of diaphragm 12 at face 13 upon which pressure may be exerted, and by selection of the thickness t of diaphragm 12. Further control is obtained selecting a material for diaphragm 12 with the appropriate elastic properties.

Figure 4:
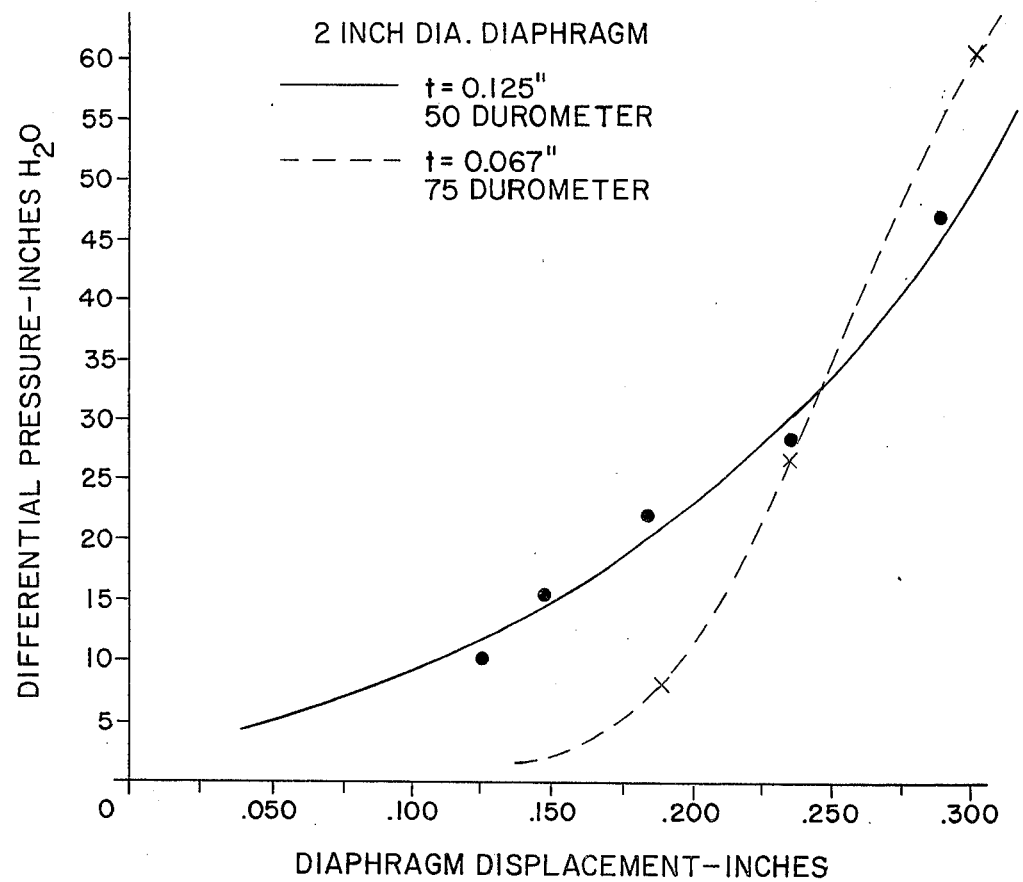
FIG. 4 is a chart diaphragm characteristics for two typical diaphragms for use in the pressure relief valve.

Reference is now made to FIG. 4 wherein a graph is presented showing diaphragm displacement in inches corresponding to differential pressure thereacross in inches of water. The graph of FIG. 4 is specifically constructed for a diaphragm 12 having a 2 inch diameter at the face 13 against which a predetermined pressure may be exerted, and having one of two thicknesses t of materials having two different durometer characteristics. The solid line shows the displacement-pressure characteristics for a diaphragm 12 having 0.125 inches thickness and 50 durometer. The dashed line shows the displacement-pressure characteristics for a diaphragm 12 having a thickness of 0.067 inches and 75 durometer.

Figure 3:
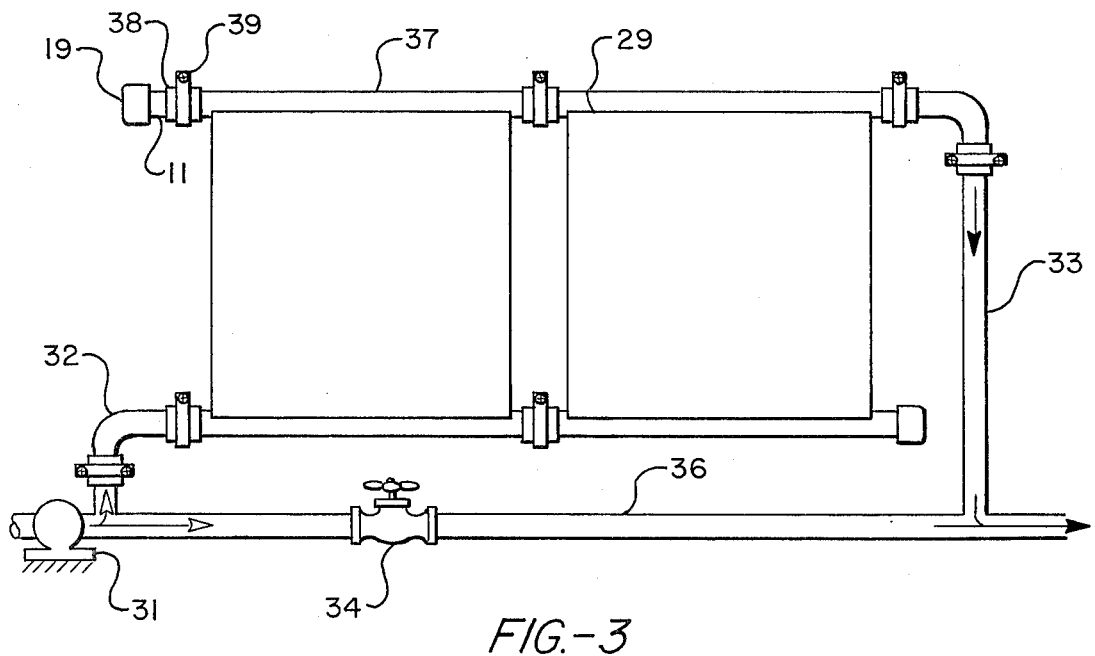
FIG. 3 is a side elevational view of the pressure relief valve used in conjunction with a solar heat exchange panel assembly.

FIG. 3 displays one practical application for the preferred embodiment of the invention where the pressure relief valve is used in conjunction with a solar heat exchange panel assembly 29 which is located in an elevated position relative to a reservoir of heat exchange medium (not shown). The reservoir is communicated with the panel assembly 29 through a pump 31 and an inlet pipe section 32. Heat exchange medium is returned to the reservoir through an outlet pipe section 33 connected to heat exchange panel assembly 29. A main flow valve 34 is also connected to the outlet pump 31 in a direct line 36 which bypasses heat exchange panel 29 thereby returning the heat exchange medium directly to the reservoir when main flow valve 34 is open. Heat exchange panel assembly 29 is described in great detail in U.S. Pat. No. 3,934,323.

FIG. 3 shows the pressure relief valve disclosed herein connected to a closed flow path through heat exchange panel assembly at the end of an upper header 37 thereon by means of a surrounding sealing sleeve 38 for bridging the gap between the open end of valve body 11 and the open end of the upper header 37. An outer clamp 39 is drawn tight to apply inwardly directed radial pressure against surrounding sealing sleeve 38 to provide a seal between valve body 11 and upper header 37. When main flow valve is in the closed position, thereby obstructing flow through direct line 36, the heat exchange medium is urged by pump 31 through inlet pipe section 32 and into heat exchange panel assembly 29. Consequently, pressure is exerted against face 14 on diaphragm 12 assisting in seating face 13 on diaphragm 12 against valve seat 23. It is clear that under these conditions there is no communication between pressure relief port 16 and inlet ports 21. When either pump 31 is turned off or main flow valve 34 is opened to allow flow through direct line 36, the heat exchange medium, following the path of least resistance, is no longer circulated through heat exchange panel assembly 29, but is directed back to the reservoir through direct line 36. In the event sufficient head exists in the remaining heat exchange medium in panel assembly 29, the tendancy of the heat exchange medium to flow away from panel assembly 29 through inlet and outlet pipe sections 32 and 33 might be such as to create a very low pressure within the closed flow path therethrough. Portions of panel assembly 29 could in this event be exposed to high differential pressures between the inside and outside thereof and would be subject to collapse, causing the closed flow path to be communicated with the outside environment. At the very least, continuous flexing of the members comprising the wall sections of the closed flow path would eventually cause structural fatigue and leakage would occur. Another consideration exists where the heat exchange medium is subject to freezing. If the panel assembly 29 is allowed to retain a volume of the heat exchange medium and freezing occurs, members providing wall sections for the closed flow path could rupture from the expansion due to the freezing heat exchange medium, thereby destroying the integrity of the closed flow path. Yet another consideration exists when main flow valve 34 or direct line 36 has a slight restriction therein. A certain amount of the heat exchange medium could flow through the panel assembly 29 even with main flow valve 34 open, due to the slight pressure difference in pipes 32 and 33. This unwanted circulation of heat exchange medium through panel assembly 29 is clearly undesirable.

To remove all of the above objectionable results the pressure relief valve is installed as shown in FIG. 3 so that when a predetermined differential pressure exists across the wall of the closed flow path, which now includes the interior of the pressure relief valve, the ambient pressure will be communicated with the interior of the closed flow path as stated above, thereby allowing the heat exchange medium to drain from panel assembly 29 and precluding the aforementioned undesirable effects.

It should be noted that the pressure valve may be adjusted to respond to any of a wide range of pressure differentials thereacross by judicious selection of the thickness t of diaphragm 12 as clearly demonstrated by the graph of FIG. 4. It should also be noted that the responsive differential pressure may be adjusted by individual selection of the thickness s of ring 17 and/or the length k of valve seat member 22. In this fashion, a pressure relief valve is constructed of simple loosely toleranced parts in readily available form, which are easily assembled by persons of relatively low mechanical skills.

What is claimed is:

1. A pressure relief valve for use with a closed flow channel comprising a valve body having an inlet port therein and an open end for communication with the closed flow channel, a fluid impervious diaphragm having a pressure relief port therein and a predetermined surface area, means for securing the periphery of said fluid impervious diaphragm axially in said valve body, a valve seat member mounted in said valve body having a valve seat thereon disposed to contact said diaphragm surrounding said pressure relief port, and means for locating the axial position of said means for securing so that the center of said diaphragm is deflected through a predetermined axial distance, said inlet port being isolated from said pressure relief port when said diaphragm is in contact with said valve seat member, whereby a predetermined pressure differential across said fluid impervious diaphragm with the higher pressure disposed to cause additional axial deflection thereof communicates said inlet port with said pressure relief port.

2. A pressure relief valve as in Claim 1 together with a gas permeable membrane within said valve body disposed between said valve seat and said inlet port, whereby ambient dust particles are barred from said valve seat.

3. A pressure relief valve as in Claim 1 wherein said valve body includes a sleeve and an end cap on the opposite end thereof from said open end, said means for locating comprising a ring contacting the periphery of one face of said fluid impervious diaphragm said ring having a predetermined axial thickness, a step formed internally in said end cap contacting said ring at the periphery thereof, said means for securing including one end face of said sleeve contacting said fluid impervious diaphragm to urge the periphery thereof against said ring, said ring thickness and the relative axial positions of said step and said valve seat providing for said predetermined axial distance.

4. A pressure relief valve as in claim 1 wherein said fluid impervious diaphragm has a predetermined elastic characteristic and said means for locating has an inside diameter defining the limits of said predetermined surface area, whereby said predetermined pressure differential is defined for causing said additional axial deflection.

5. A pressure relief valve as in Claim 1 wherein said fluid impervious diaphragm has a predetermined thickness and said valve seat member has a predetermined axial dimension extending between said valve body and said fluid impervious diaphragm whereby said predetermined pressure differential is defined for causing said additional deflection.

6. In combination with a solar heat exchange panel assembly located in an elevated position relative to a reservoir of heat exchange medium in communication with the panel assembly through an inlet and an outlet therefor and through which the heat exchange medium is urged by operation of a pump, a pressure relief valve adapted for connection to an uppermost portion of the solar heat exchange panel assembly including a valve body having an inlet port, a valve seat member mounted in said valve body, a valve seat on said valve seat member, a fluid impervious diaphragm mounted in said valve body and having a pressure relief port therethrough, said valve seat being in contact with said fluid impervious diaphragm surrounding said pressure relief port, means for locating the center thereof through a predetermined axial distance, said inlet port and pressure relief port being isolated by contact between said valve seat and said fluid impervious diaphragm, whereby pressure differential above a predetermined pressure differential across said fluid impervious diaphragm urges additional deflection at the center thereof, thereby communicating said inlet and pressure relief ports and allowing heat exchange medium to drain from the solar heat exchange panel assembly back into the reservoir when pressure drops in said panel.

7. The combination of claim 6 together with a filter disposed between said inlet port and said valve seat, whereby ambient dust particles are prevented from entering said inlet port and lodging between said valve seat and said fluid impervious diaphragm.

8. The method of relieving differential pressure between a first and second volume, comprising the steps of interposing an impermeable flexible diaphragm between the first and second volumes, providing a flow path between the first and second volumes through one part of the impermeable diaphragm, obstructing the flow path by interposing a member between the first volume and the one part of the impermeable diaphragm, locating the periphery of the impermeable flexible diaphragm in axial relation to the member, and axially displacing the center of the impermeable flexible diaphragm by urging the member into contact therewith, whereby a high pressure in the first volume producing a pressure differential between the first and second volumes causes the impermeable diaphragm to be additionally displaced, thereby losing contact with the member and communicating the first volume with the one part of the impermeable diaphragm and the second volume through the flow path.

9. The method of claim 8 together with the step of filtering the flow path thereby preventing dust particles from the first volume from lodging between the impermeable diaphragm and the member obstructing the flow path.

* * * * *